United States Patent [19]

Sharma et al.

[11] Patent Number: 5,129,947
[45] Date of Patent: Jul. 14, 1992

[54] AQUEOUS PRINTING INKS HAVING IMPROVED FREEZE-THAW PROPERTIES

[75] Inventors: Mahendra K. Sharma; Hieu D. Phan, both of Kingsport, Tenn.

[73] Assignee: Eastman Kodak Company, Rochester, N.Y.

[21] Appl. No.: 513,748

[22] Filed: Apr. 24, 1990

[51] Int. Cl.$^5$ .............................................. C09D 11/02
[52] U.S. Cl. ....................................... 106/20; 528/293; 528/295; 528/301; 528/302; 528/304; 528/306; 522/45; 522/104
[58] Field of Search ..................... 106/20, 23; 528/293, 528/295, 301, 302, 304, 306; 522/45, 104

[56] References Cited

U.S. PATENT DOCUMENTS

| | | | |
|---|---|---|---|
| 3,546,008 | 12/1970 | Shields et al. | 117/138.8 |
| 3,563,942 | 2/1971 | Heiberger | 260/29.2 |
| 3,734,874 | 5/1973 | Kibler et al. | 260/29.2 |
| 3,779,993 | 12/1973 | Kibler et al. | 260/75 |
| 4,145,469 | 3/1979 | Newkirk et al. | 428/245 |
| 4,148,779 | 4/1979 | Blackwell et al. | 260/40 |
| 4,152,485 | 5/1979 | Mizumara et al. | 428/425 |
| 4,233,196 | 11/1980 | Sublett | 260/29.2 |
| 4,304,900 | 12/1981 | O'Neill | 528/290 |
| 4,304,901 | 12/1981 | O'Neill et al. | 528/290 |
| 4,335,220 | 5/1982 | Coney | 523/414 |
| 4,340,519 | 7/1982 | Kotera et al. | 523/414 |
| 4,704,309 | 11/1987 | Coney et al. | 427/258 |
| 4,738,785 | 4/1988 | Langston et al. | 210/738 |
| 4,772,491 | 9/1988 | Nealy et al. | 427/336 |
| 4,804,719 | 2/1989 | Weaver et al. | 525/420 |
| 4,847,316 | 7/1989 | Schick et al. | 524/88 |
| 4,855,344 | 8/1989 | Nealy et al. | 524/86 |
| 4,883,714 | 11/1989 | Stockl et al. | 428/412 |
| 4,912,157 | 3/1990 | Clark et al. | 524/265 |
| 4,916,177 | 4/1990 | Coney et al. | 524/389 |

FOREIGN PATENT DOCUMENTS 62-21380  5/1987  Japan .

OTHER PUBLICATIONS

English translation of JP57-10663, Jan. 20, 1982, pp. 1-15.

Primary Examiner—Mark L. Bell
Assistant Examiner—Helene Klemanski
Attorney, Agent, or Firm—Thomas R. Savitsky; Betty J. Deaton; William P. Heath

[57] ABSTRACT

Disclosed are ink compositions having improved freeze-thaw properties that contain an effective amount of propylene glycol, for example, 0.5 to 10 weight percent. The inks also contain a water-dissipatable polyester prepared from certain amounts of isophthalic acid, 5-sodiosulfoisophthalic acid, cyclohexanedimethanol, and diethylene glycol.

30 Claims, No Drawings

5,129,947

AQUEOUS PRINTING INKS HAVING IMPROVED FREEZE-THAW PROPERTIES

FIELD OF THE INVENTION

The present invention concerns printing inks having improved freeze-thaw properties which contain certain water-dispersible polyesters and propylene glycol.

BACKGROUND OF THE INVENTION

Aqueous printing inks which use a water-dispersible or dissipatable polyester as, for example, a pigment carrier or binder, are known in the art as taught in, for example, U.S. Pat. Nos. 4,883,714; 4,847,316; 4,704,309; and 4,738,785. The polyesters described in these prior art patents require the presence of a poly(ethylene glycol) moiety (the definition of which includes diethylene glycol), as well as a metal sulfonate moiety attached to an aromatic nucleus. Inks containing such a polyester have many desirable properties such as good adhesion to a variety of substrates and a wide viscosity range.

However, because of the wide range of printing conditions and substrates used in the printing industry, a given ink formulation can have ideal properties for some applications and poor properties for other applications. For example, it has been shown that water resistance of certain of such aqueous inks on substrates such as aluminum can depend upon the particular species of polyester material employed (see Ser. No. 07/513,724, filed even date herewith in the names of Linda Jane Adams and George J. O'Neill). While the inks containing these particular polyesters have excellent water resistance when printed onto aluminum, we have unexpectedly discovered that these same inks have poor freeze-thaw stability. In order to solve the problem of poor freeze-thaw stability of these inks, we have incorporated propylene glycol into these inks in amounts and under conditions as hereinafter described.

SUMMARY OF THE INVENTION

The present invention is directed to an ink composition or concentrate thereof comprising (A) about 4 to 80 weight percent of at least one linear, water-dissipatable polyester having an inherent viscosity of at least about 0.1 as measured in a 60/40 parts by weight solution of phenol/tetrachloroethane at 25° C. and at a concentration of 0.5 gram of polyester in 100 ml of solvent, the polyester containing substantially equimolar proportions of acid moiety repeating units (100 mole %) to hydroxy moiety repeating units (100 mole %), the polyester comprising repeating units of components (a), (b), (c) and (d), as follows wherein all stated mole percentages are based on the total of all acid and hydroxy moiety repeating units being equal to 200 mole %:

(a) about 90 to about 97 mole % isophthalic acid,
(b) about 3 to about 10 mole % 5-sulfoisophthalic acid,
(c) about 70 to about 85 mole % 1,4-cyclohexanedimethanol, and
(d) about 15 to about 30 mole % diethylene glycol;
(B) 0 to about 60 weight percent colorant;
(C) 0 to about 95 weight percent water; and
(D) an effective amount of propylene glycol.

The effective amount of propylene glycol (i.e., component (D)) is that amount necessary to improve the freeze-thaw stability of the ink relative to a control ink without the propylene glycol.

DETAILED DESCRIPTION OF THE INVENTION

The term "ink" or "ink composition" is used herein in its broad sense as including the use thereof for coatings in all forms such as letters, patterns, and coatings without design, whether or not such coatings contain colorants such as pigments, and include finished inks, overprints, and primers.

Whenever the term "water-dissipatable" or "water-dispersible" is used in this description, it will be understood to refer to the activity of a water or aqueous solution on the applicable polymer. The term is specifically intended to cover those situations wherein the solution dissolves and/or disperses the polymer material therein and/or therethrough.

A preferred amount of component (D) is from about 0.5 to about 10 weight percent (based on the total weight of components (A) through (D)); a more preferred amount is about 2 to about 5 weight percent, and the most preferred amount is about 3 to about 5 weight percent. Although lower amounts of propylene glycol (e.g., 0.5 weight percent) can sometimes be employed to improve the freeze-thaw stability of the ink, in many of such formulations it is desirable to employ other polyesters or polyesteramide materials known in the art which impart good freeze-thaw stability to inks, in addition to the polyester required in the inks of the present invention. For example, the polyester material described in Example 1 of U.S. Pat. No. 4,883,714 may be used for this purpose. When such a different polymer is desirable, typically an amount of about 1.0 to about 40.0 weight percent, based on the weight of component (A), is employed.

In the ink compositions of the present invention, it is preferred that component (A) is present in an amount of about 5 to 40 weight percent, that component (B) is present in an amount of about 0 to 35 weight percent, and that component (C) is present in an amount of about 15 to 95 weight percent, more preferably 35 to 90 weight percent, such percentages being based on the total weight of components (A) through (D). If the ink composition is a finished ink, it is preferred that at least about 0.5 weight percent of pigment (component (B)) is present. More typically, in inks, at least about 1 weight percent of pigment is present, preferably at least about 5 weight percent. If the ink composition contains an organic pigment, typically such an organic pigment is present in an amount of about 17.5 weight percent or less of the total composition. If the ink composition contains an inorganic pigment, typically such inorganic pigment is present in an amount of about 50 weight percent or less of the total composition.

The ink compositions can optionally contain up to about 15 weight percent of the total composition, preferably up to about 3 weight percent, of one or more additional additives. Such additional additives include waxes such as Jonwax 26, Jonwax 120 (available from S. C. Johnson and Sons, Inc., Racine, Wisconsin 43403, U.S.A.), or Vanwax 35 (available from Vantage, Garfield, N.J. 07026); surfactants such as Surfynol 104 or Surfynol 440 (available from Air Products and Chemicals, Allentown, Penna. 18105), Carbowet 990 (available from Vantage), and Aerosol OT-75 (available from American Cyanamid, Wayne, N.J. 07470); defoamers such as Foamaster 111 (available from Henkel Corporation, Morristown, N.J. 07960); alcohols containing 1 to 10 carbon atoms such as ethanol, methanol, n-propyl alcohol, or isopropyl alcohol; biocides; pH stabilizers; thickeners such as Acrysol RM-825 (available from Rohm & Haas, Philadelphia, Penna. 19105); and the like.

Although we have found that certain glycols or glycol ethers other than propylene glycol, such as propylene glycol monomethyl ether, do not improve freeze-thaw stability, such compounds may be desirable to incorporate into inks for other reasons such as improving wet out or drying rates.

Typically, it is desirable to add a small amount of one or more pH stabilizers to the ink compositions to keep the pH within a desired range. For example, it is common to add about 0.1 weight percent sodium acetate to an ink or aqueous solution/dispersion of polyester.

Preferred amounts of certain additional additives in ink compositions of the present invention are set forth in the following table.

| Component | Weight Percent |
|---|---|
| Wax[a] | 0.0–3.0 |
| Surfactant[b] | 0.0–3.0 |
| Defoamer[c] | 0.0–2.0 |
| Alcohol[d] | 0.0–10.0 |

[a] e.g., Jonwax 26, 120, Vanwax 35
[b] e.g., Surfynol 104,440
[c] e.g., Foamaster 111
[d] e.g., n-Propyl Alcohol, Isopropyl Alcohol, It is especially preferred to use a defoamer or antifoam in an amount of about 0.05 to 0.25 weight percent; more preferred is about 0.1 to 0.25 weight percent. Biocides are typically present in an amount of from 0 to about 1 weight percent. Waxes are especially useful in certain ink compositions, especially overprints, and such inks typically contain at least 0.01 weight percent of one or more of said waxes.

As appreciated in the art, the exact components and properties of components desired for any given ink application can vary, and, therefore, routine experimentation may be required to determine the optional components and proportions of components for a given application and desired properties.

Of course, it is contemplated that two or more of any of the components (A) through (D) of the ink compositions of the present invention can be employed. In addition, for safety reasons it is preferred that the inks of the present invention have a flash point of more than about 100° F.

The polyesters useful in the inks of the present invention can be prepared in accordance with the methodology described in the Examples section of this disclosure and the prior art patents cited therein.

The term "repeating unit" of a particular component in the polyester useful in the invention means that repeating unit of the particular component known in the art to be incorporated into a polyester. Thus, a "1,4-cyclohexanedimethanol repeating unit" is a moiety of the structure:

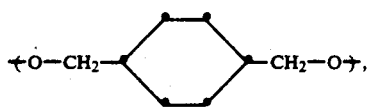

a "isophthalic acid repeating unit" is a moiety of the structure:

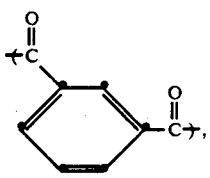

a "5-sulfoisophthalic acid repeating unit" is of the structure:

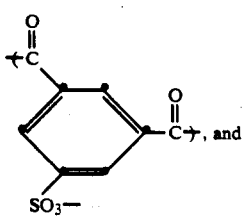

a "diethylene glycol repeating unit" is of the structure:

—O—CH$_2$—CH$_2$—O—CH$_2$—CH$_2$—O—.

Of course, the above-described repeating units describe internal polymer structures and the external (terminal) repeating units will typically terminate with a hydroxyl or carboxyl group.

Therefore, any chemical derivative which will result in the desired repeating unit can be used to prepare the polyester of the present invention. For example, the corresponding acid anhydrides, esters, and acid chlorides (as well as the free diacids themselves) can be used as the particular starting material for incorporating the desired dicarboxylic acid repeating unit into the polyester. The total amount of acid moiety repeating units in the polyester useful in the present invention is 100 mole %. The acid moiety repeating units in the polyester of the invention are components (a) and (b); therefore, the total mole percentage of components (a) plus (b) in the polyester is 100 mole %. Likewise, the total amount of hydroxy moiety repeating units in the polyester useful in the present invention is 100 mole %. The hydroxy moiety repeating units in the polyester of the invention are components (c) and (d); therefore, the total mole percentage of components (c) plus (d) in the polyester is 100 mole %. It follows then that the total of all acid moiety and hydroxy moiety repeating units in the polyester totals 200 mole %.

In the polyester, component (b), i.e., the 5-sulfoisophthalic acid, is typically in the form of a metallic sulfonate salt. The metal ion of the sulfonate salt group may be Na$^+$, Li$^+$, K$^+$, Mg$^{++}$, Ca$^{++}$, Cu$^{++}$, Fe$^{++}$, or Fe$^{+++}$. It is also possible that the sulfonate salt is nonmetallic and can be a nitrogen-containing base as described in U.S. Pat. No. 4,304,901, incorporated herein by reference. The most preferred component or moiety is 5-sodiosulfoisophthalic acid.

The inherent viscosities (I.V.) of the particular water-dissipatable polyester materials useful herein are at least about 0.1 as determined according to ASTM D2857-70 procedure, in a Wagner Viscometer of lab Glass, Inc., of Vineland, N.J. having a ½ mL capillary bulb, using a polymer concentration of about 0.5% by weight in 60/40 by weight of phenol/tetrachloroethane. It is preferred that the I.V. of the polyester (component (A) of the ink) is about 0.1 to about 1.0, more preferably about 0.2 to about 0.6. The procedure for determining I.V. is carried out by heating the polymer/solvent system at 120° C. for 15 minutes, cooling the solution to 25° C. and measuring the time of flow at 25° C. The I.V. is calculated from the equation $$(\eta) = \frac{\ln \frac{t_s}{t_o}}{C}$$

where:

($\eta$) = inherent viscosity at 25° C. at a polymer concentration of 0.5 g/100 mL of solvent;
ln = natural logarithm;
$t_s$ = sample flow time;
$t_o$ = solvent-blank flow time; and
C = concentration of polymer in grams per 100 mL of solvent = 0.5.

The units of the inherent viscosity throughout this application are in deciliters/gram.

Specific preferred polyesters useful as component (A) of the ink of the invention include:

wherein component (a) is about 91 mole % isophthalic acid, component (b) is about 9 mole % 5-sodiosulfoisophthalic acid, component (c) is about 75 mole % 1,4-cyclohexanedimethanol, and component (d) is about 25 mole % diethylene glycol;

wherein component (a) is about 93 mole % isophthalic acid, component (b) is about 7 mole % 5-sodiosulfoisophthalic acid, component (c) is about 70 mole % 1,4-cyclohexanedimethanol, and component (d) is about 30 mole % diethylene glycol;

wherein component (a) is about 93 mole % isophthalic acid, component (b) is about 7 mole % 5-sodiosulfoisophthalic acid, component (c) is about 85 mole % 1,4-cyclohexanedimethanol, and component (d) is about 15 mole % diethylene glycol;

wherein component (a) is about 95 mole % isophthalic acid, component (b) is about 5 mole % 5-sodiosulfoisophthalic acid, component (c) is about 85 mole % 1,4-cyclohexanedimethanol, and component (d) is about 15 mole % diethylene glycol;

wherein component (a) is about 95 mole % isophthalic acid, component (b) is about 5 mole % 5-sodiosulfoisophthalic acid, component (c) is about 70 mole % 1,4-cyclohexanedimethanol, and component (d) is about 30 mole % diethylene glycol; and wherein component (a) is about 97 mole % isophthalic acid, component (b) is about 3 mole % 5-sodiosulfoisophthalic acid, component (c) is about 85 mole % 1,4-cyclohexanedimethanol, and component (d) is about 15 mole % diethylene glycol.

It is preferred that the ink composition is printed onto a substrate such as metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide, polypropylene, polyethylene or polystyrene;

The ink compositions of this invention can be for any of the typical ink applications such as flexographic, gravure, letterpress, ink-jet, or screen-process printing applications. The ink compositions of the present invention have excellent adhesion to a wide variety of substrates including plastic films such as polyester; aluminum foil; glass; and paper.

The ink compositions of the present invention generally have a pH of about 8.2 or lower; preferred is a pH of about 5 to 8. If the pH is higher than about 8.2, there is a danger of the polymer(s) hydrolyzing which can result in gelling of the system under certain circumstances.

The polyester material can be dispersed in water or aqueous solution using the techniques described herein or known in the art and then blended with the other components. The following procedure can be used for dispersing the polyester in water: The water should be preheated to about 140° F. (60° C.) to about 200° F. (93.33° C.) and the polyester in pellet form is added rapidly to the vortex under high shear stirring. A Cowles Dissolver, Waring Blender, or similar equipment may be used. Depending upon the volume prepared, dispersion of the pellets should be complete within about 15 minutes to about 2 hours with agitation. It may be desirable to add the total amount of polyester in portions over a period of time. Continued agitation with cooling may be desirable to prevent thickening at the surface due to water evaporation. Viscosities of the dispersions remain low up to polyester levels of 25 percent to 30 percent and viscosities increase sharply above these levels. Viscosities of the dispersions will be influenced by the degree of polymer dispersion obtained which is affected by the dispersing temperature, shear, and time. The polyester content typically may range from about 15 percent to about 50 percent by weight of the aqueous dispersion with the preferred for most applications being from about 26 percent to about 38 percent.

The inks, overprints, and primers of this invention can be prepared, for example, as disclosed in U.S. Pat. No. 4,148,779, which is incorporated herein by reference in its entirety. For example, the printing ink, overprint, or primer may be prepared as follows: The pigment is added to the polymer dispersion and, at a properly adjusted viscosity, dispersed there into with ball mill, sand mill, high-shear fluid flow mill, Cowles Dissolver, Kady Mill or the like. The pigments also may be dispersed directly in the polymer by milling on a heated two-roll mill at about 220° to 360° F. (104.44° to 182.22° C.) and using processing aids as desired, such as solvents or plasticizers. The viscosity and printing characteristics of the ink composition may be modified further by addition of water, solvents, plasticizers, sequestered wax, surfactants, and the like to suit the particular printing needs. The amounts and nature of these optional additives have been previously described herein.

The present invention is not limited to any type of colorant and can accommodate any pigment or disperse dye which can be dispersed, milled, mixed, blended or dissolved in any manner in either the polyester, water, or aqueous polymer system.

Exemplary useful C.I. pigments for use in the present invention are given in the following table:

| Pigments | |
|---|---|
| Generic Name | C.A. Index/Chemical Name |
| C.I. Pigment Yellow 17 | Butanamide, 2,2'-[(3,3'-dichloro[1,1'-biphenyl]-4,4'-diyl)bis(azo)bis[N-(2-methoxyphenyl)-3-oxo- |
| C.I. Pigment Blue 27 | Ferrate (4-1), hexakis (cyano-C)-ammonium iron |

-continued

Pigments

| Generic Name | C.A. Index/Chemical Name |
|---|---|
| C.I. Pigment Red 49:2 | (3+)(1:1:1) 1-Naphthalenesulfonic acid, 2-[(2-hydroxy-1-naphthalenyl)azo]-, calcium salt (2:1) |
| C.I. Pigment Red 81:1 | Benzoic acid, 2, -[6-ethylamino)-3-(ethylimino)-2,7-dimethyl-3H-xanthen-9-yl]-,ethyl ester, w/molybdenum tungsten hydroxide oxide phosphate |
| C.I. Pigment Red 81:3 | Benzoic acid, 2-[6-ethylamino)-3-ethylimino)-2,7-dimethyl-3H-xanthen-9-yl]-,ethyl ester, molybdatesilicate |
| C.I. Pigment Red 81:x | Benzoic acid, 2-[6-(ethyl amino)-3-(ethylimino)-2,7-dimethyl-3H-xanthen-9-yl]-ethyl ester, molybdatephosphate |
| C.I. Pigment Yellow 83 | Butanamide, 2,2'-[(3,3'-dichloro[1,1'-biphenyl] 4,4'-diyl)bis(azo)bis[N-(4-chloro-2,5-dimethoxy-phenyl)-3-oxo- |
| C.I. Pigment Red 57:1 | 2-Naphthalenecarboxylic acid, 3-hydroxy-4-[(4-methyl-2-sulfophenyl)azo], calcium salt (1:1) |
| C.I. Pigment Red 49:1 | 1-Naphthalenesulfonic acid, 2-[(2-hydroxy-1-naphthalenyl)azo]-, barium salt (2:1) |
| C.I. Pigment Violet 23 | Diindolo[3,3',2'm] triphenodioxazine, 8,18-dichloro-5,15-diethyl-5,15-dihydro- |
| C.I. Pigment Green 7 | C.I. Pigment Green 7 |
| C.I. Pigment Blue 61 | Benzenesulfonic acid, [[4-[[4-phenylamino)phenyl]-[4-(phenylimino)-2,5-cyclo-hexadien-1-ylidene]methyl]-phenyl]amino]- |
| C.I. Pigment Red 48:1 | 2-Naphthalenecarboxylic acid, 4-[(5-chloro-4-methyl-2-sulfophenyl)azo]3-hydroxy-, barium salt (1:1) |
| C.I. Pigment Red 52:1 | 2-Naphthalenecarboxylic acid, 4-[(4-chloro-5-methyl-2-sulfophenyl)azo]-3-hydroxy, calcium salt (1:1) |
| C.I. Pigment Violet 1 | Ethanaminium, N-[9-(2-carboxyphenyl)-6-(diethylamino)-3H-xanthen-3-ylidene]-N-ethyl-, molybdatetungstatephosphate |
| C.I. Pigment White 6 | Titanium oxide (TiO$_2$) |
| C.I. Pigment Blue 15 | Copper, [29H, 31H phthalocyaninato (2-)N$^{29}$, N$^{30}$, N$^{31}$, N$^{32}$]-, (Sp-4-1)- |
| C.I. Pigment Yellow 12 | Butanamide, 2,2'-[(3,3' dichloro[1,1'-biphenyl] 4,4'-diyl)bis(azo)]bis[3-oxo-N-phenyl- |
| C.I. Pigment Blue 56 | Benzenesulfonic acid, 2-methyl-4-[[4-[[4-[(3-methylphenyl)amino]phenyl]-[4-[(3-methylphenyl)-imino]-2,5-cyclohexadien-1-ylidene]methyl]phenyl] amino]- |
| C.I. Pigment Orange 5 | 2-Naphthalenol, 1-[(2,4-dinitrophenyl)azo]- |
| C.I. Pigment Black 7 | Carbon black |
| C.I. Pigment Yellow 14 | Butanamide, 2,2'-[(3,3'-dichloro[1,1'-biphenyl]-4,4'-diyl)bis(azo)]bis[N- |

-continued

Pigments

| Generic Name | C.A. Index/Chemical Name |
|---|---|
| C.I. Pigment Red 48:2 | (2-methylphenyl)-3-oxo-2-Naphthalenecarboxylic acid, 4-[(5-chloro-4-methyl-2-sulfophenyl)azo]-3-hydroxy-, calcium salt (1:1) |
| C.I. Pigment Blue 15:3 | Copper, [29H, 31H phthalocyaninato (2-)-N$^{29}$, N$^{30}$, N$^{31}$]-, (SP-4-1) |
| C.I. Pigment Yellow 1 | Butanamide, 2-[(4-methyl.2-nitrophenyl)azo]-3-oxo-N-phenyl- |
| C. I. Pigment Yellow 3 | Butanamide, 2-[(4-chloro-2-nitrophenyl)azo]-N-(2-chlorophenyl)-3-oxo- |
| C. I. Pigment Yellow 13 | Butanamide, 2,2'-[(3,3'-dichloro[1,1'-biphenyl]-4,4'-diyl)bis(azo)bis[N-2,4-dimethylphenyl)-B-oxo- |
| C.I. Pigment Orange 16 | Butanamide, 2,2'-[(3,3'-dimethoxy[1,1'-biphenyl]-4,4'-diyl)bis(azo)]bis[3-oxo-N-phenyl- |
| C.I. Pigment Yellow 55 | Butanamide, 2,2'-[(3,3'-dichloro[1,1'-biphenyl]-4,4'-diyl)bis(azo)]bis[N-(4-methylphenyl)-3-oxo- |
| C.I. Pigment Red 41 | 3H-Pyrazol-3-one,4,4'-[(3,3'-dimethoxy[1,1'-biphenyl]-4,4'-diyl)bis-(azo)]bis[2,4-dihydro-5-methyl-2-phenyl- |
| C.I. Pigment Orange 34 | 3H-Pyrazol-3-one,4,4'-[(3,3'-dichloro[1,1'-biphenyl]-4,4'-diyl)bis-(azo)]bis[2,4-dihydro-5-methyl-2-(4-methylphenyl)- |
| C.I. Pigment Blue 62 | 4,4'-Bis(diethylamino) benzophenone condensed with N-ethyl-1-naphthylamine in toluene with phosphorous oxychloride and converted to the copper ferrocyanide salt (PTMA salt in P.Blue 1) |
| C.I. Pigment Red 22 | 2-Naphthalenecarboxamide, 3-hydroxy-4-[(2-methyl-5-nitrophenyl)azo]-N-phenyl- |
| C.I. Pigment Red 170 | 2-Naphthalenecarboxamide, 4-[[(4-(aminocarbonyl) phenyl]azo]-N-(2-ethoxy-phenyl)-3-hydroxy- |
| C.I. Pigment Red 88 | Benzo[b]thiophen-3(2H)-one, 4,7-dichloro-2-(4,7-dichloro-3-oxobenzo-[b]thien-2(3H)-ylidene)- |
| C.I. Pigment Yellow 151 | A diazotized aniline derivative coupled with an acetoacetyl derivative of 5-aminobenzimidazolone |
| C.I. Pigment Red 184 | A diazotized substituted aniline coupled with a derivative of 3-hydroxy-2-naphthanilide |
| C.I. Pigment Blue 1:2 | Ethanaminium, N-[4-[[4-(diethylamino)phenyl][4-(ethylamino)-1-1 naphthalenyl]methylene]-2,5-cyclohexadien-1-ylidene]-N-ethyl-, [orthosilicate(4-)]hexa-triacontaoxododeca-molybdate(4)-(4:1) |
| C.I. Pigment Red 3 | 2-Naphthalenol, 1-[(4-methyl-2-nitrophenyl)azo] |
| C.I. Pigment Blue 15:1 | Copper, [29H, 32H-phthalocyaninato(2-)-N$^{29}$, N$^{30}$, N$^{31}$, N$^{32}$],(SP-4-1) or Copper, [chloro-29H, |

| Pigments | |
|---|---|
| Generic Name | C.A. Index/Chemical Name |
| | 31H-phthalocyaninato (2-1)-$N^{29}, N^{30}, N^{31}, N^{32}$]-. |
| C.I. Pigment Red 23 | 2-Naphthalenecarboxamide, 3-hydroxy-4-[(2-methoxy-5-nitrophenyl)azo]-N-(3-nitrophenyl)- |
| C.I. Pigment Red 112 | 2-Naphthalenecarboxamide, 3-hydroxy-N-(2-methylphenyl)-4-[(2,4,5-trichlorophenyl)azo]- |
| C.I. Pigment Yellow 126 | A tetrazotized derivative of 3,3-dichlorobenzidene coupled with a derivative of acetoacetanilide |
| C.I. Pigment Red 169 | 3-Ethylamino-p-cresol condensed with phthalic anhydride, esterified with ethanol and a mineral acid, and converted to the copper ferrocyanide complex (chloride salt is C.I. Basic Red 1, PTMA salt is P.Red 81:1). |
| C.I. Pigment Orange 13 | 3H-Pyrazol-3-one, 4,4'-[3,3'-dichloro [1,1'-biphenyl]-4,4'-diyl)bis-(azo)]bis[2,4-dihydro-5-methyl-2-phenyl-. |
| C.I. Pigment Red 10 | 2-Naphthalenecarboxamide, 4-[(2,5-dichloro-phenyl)-azo]-3-hydroxy-N-(4-methylphenyl)- |
| C.I. Pigment Blue 1:X | Ethanaminium, N-[4-[[4-(diethylamino)phenyl][4-(ethylamino)-1-naphthalenyl]methylene]2,5-cyclohexadien-1-ylidene]-N-ethyl-, molybdate-phosphate |
| C.I. Pigment Yellow 42 | Iron oxide ($Fe_2O_3$) hydrate |
| C.I. Pigment Red 101 | Iron oxide ($Fe_2O_3$) |
| C.I. Pigment Brown 6 | Iron oxide ($Fe_2O_3$), some FeO and $Fe_2O_3.H_2O$ |
| C.I. Pigment Brown 7 | Iron oxide ($Fe_2O_3$) plus varying amounts of clay |
| C.I. Pigment Brown 7:X | $Fe_2O_3$. × $MnO_2$ with varying amounts of clay |
| C.I. Pigment Black 11 | $FeO.Fe_2O_3$ |
| C.I. Pigment Metal 1 | Aluminum |
| C.I. Pigment Metal 2 | Copper, zinc |

Other useful pigments, in addition to those specifically identified above, include those described in NPIRI Raw Materials Data, Vol. 4, Pigments (1983).

During preparation of an ink, it is not particularly critical when the propylene glycol is added. It can be added to the polymer dispersion or directly to the finished ink. Typically, to get complete dispersion or solubilization of the propylene glycol, it is required to apply heat (e.g., 90° C.) and agitation for a sufficient time to achieve complete dispersion or solubilization.

In addition to improved freeze-thaw stability, the inks of the present invention may also have improved water-resistance, blocking resistance, flow-out, high temperature stability, adhesion, substrate wetting, and/or rewettability of the printing cylinder after temporary stopping of the printing machine.

Freeze-thaw stability can be defined as no substantial change in viscosity after the inks thaw within 4-8 hours at an ambient temperature after storing in freezer at −30° C. for about 18-24 hours. By the phrase "no substantial increase in viscosity" is meant that an ink has less than or equal to a 30% increase in viscosity after being subjected to one freeze-thaw cycle as described above. Any ink undergoing greater than a 30% increase in viscosity after such a freeze-thaw cycle is considered freeze-thaw unstable. Freeze-thaw stability can be determined by the procedures described in the examples hereof. It is preferred that, in addition to improved freeze-thaw stability, an ink of the present invention has improved gloss, adhesion, water resistance, ink stability and film forming ability, as compared to the same ink without propylene glycol (component (D)).

The following examples are to illustrate the invention but should not be interpreted as a limitation thereon. All percentages are by weight unless indicated otherwise.

Preparation of Polymers

The polymers prepared are copolyesters comprising isophthalate moieties (I), 5-sodiosulfoisophthalate moieties (SIP), diethylene glycol moieties (DEG), and 1,4-cyclohexanedimethanol (CHDM) moieties. The starting materials, I and SIP, can be present as either the acid, dimethyl ester, diethylene glycol esters, or other suitable esters (e.g., ethyl, mixed DEG, CHDM) or that can be reacted with the glycols and the subsequent reaction product either removed or incorporated into the system as the DEG diester would be (see U.S. Pat. Nos. 3,546,008; 3,734,874; and 3,779,993). Also other cations could be substituted for Na on the sulfonate as outlined in U.S. Pat. Nos. 3,546,008; 3,734,874; and 3,779,993. Generally, typical catalysts used for esterification, ester exchange, and polyesterification can be used in the polymer preparation (see U.S. Pat. Nos. 3,546,008; 3,734,874; and 3,779,993). The polymers are prepared by conventional polyesterification methods.

EXAMPLES OF POLYMER PREPARATION

Method 1

0.5 Mole of polymer is prepared in the laboratory by the following technique. A polymer is prepared with acid components consisting of 97 mole % isophthalate acid and 3 mole % 5-sodiosulfoisophthalate acid, glycol of 54 mole % diethylene glycol and 46 mole % 1,4-cyclohexanedimethanol (cis/trans ratio of about 35/65). The following are weighed directly into a 500 ml round-bottom flask or are weighed and transferred:

Example A (Comparative)

80.51 g (0.485 mole) isophthalic acid
4.02 g (0.015 mole) 5-sodiosulfoisophthalic acid
54.06 g (0.51 mole) diethylene glycol
37.44 g (0.26 mole) 1,4-cyclohexanedimethanol
0.123 g (0.0015 mole) anhydrous sodium acetate
1.02 ml (100 ppm) titaniumtetraisopropoxide catalyst A stainless steel stirrer shaft and blade were used to stir the system to facilitate reaction and removal of volatiles. A Belmont metal bath placed in a heating mantle connected to a temperature controller was used as the heating medium. The system was purged with nitrogen and kept under a $N_2$ blanket during the run. Dry ice traps were used to collect volatiles. An oil based vacuum pump was used to place the system under reduced pressure for molecular weight buildup after the esterification stage.

The bath was heated to 220° C. and the flask and contents were inserted in the bath and stirred for 80 minutes. The temperature was increased to 265° C. over about a 10 minute period and the system was placed under reduced pressure over 5 minutes time (<10 mm torr) and held for 10 minutes. The system was returned to the nitrogen purge, the polymer was cooled and removed from the flask and ground. The polymer had an I.V. (inherent viscosity in 60/40 phenol/tetrachloroethane) of 0.296. Analysis by nuclear magnetic resonance spectroscopy (NMR) showed a composition of 3 mole % 5-sodiosulfoisophthalic acid, 97 mole % isophthalic acid, 47 mole % 1,4-cyclohexanedimethanol and 53 mole % diethylene glycol. The polymer had a second cycle glass transition temperature of 40° C. by differential scanning calorimetry (DSC).

Example B (Comparative)

Similar equipment was used to prepare a polymer with a target composition of 90 mole % isophthalic acid, 10 mole % 5-sodiosulfoisophthalic acid, 60 mole % cyclohexanedimethanol and 40 mole % diethylene glycol. The following components were used:

87 30 g (0.450 mole) dimethyl isophthalate
14.80 g (0.050 mole) dimethyl 5-sodiosulfoisophthalate
45.36 g (0.315 mole) 1,4-cyclohexanedimethanol
42.40 g (0.400 mole) diethylene glycol
0.410 g (0.005 mole) anhydrous sodium acetate
0.75 cc (75 ppm) titanium tetraisopropoxide catalyst solution at 1.45% Ti The materials were charged to the flask and heated at 200° C. for about 1 hour, the temperature was increased to 240° C. and held for about 30 minutes, the temperature was then increased to 280° C. and the system was placed under <1.0 mm Hg pressure and held for 25–30 minutes. The polymer had an inherent viscosity of 0.405 and a composition by NMR of 10.9 mole % 5-sodiosulfoisophthalate and 89.1 mole % isophthalic acid; the glycols were analyzed as 43.7 mole % diethylene glycol and 56.3 mole % 1,4-cyclohexanedimethanol. The polymer had a second cycle glass transition temperature of 58.5° C. by DSC analysis.

Method 2

Polymers could also be prepared in larger quantities in stainless steel batch process equipment in a pilot facility. An example of such a preparation is outlined below. The following were charged to a stirred reactor:

Example C (Comparative)

9.40 lbs isophthalic acid
212.86 g 5-sodiosulfoisophthalic acid
6.19 lbs diethylene glycol
4.25 lbs 1,4-cyclohexanedimethanol
27.0 g titanium tetraisopropoxide in n-butanol
5.90 g sodium acetate The materials were placed under $N_2$ purge and then heated to 230° C. and held for 1.5 hours. The temperature was increased to about 265° C. and placed under <4000 microns pressure for about 20 minutes. The molten polymer was extruded and cooled in dry ice. The resulting product had an I.V. of 0.40 and a composition by NMR of 2.6 mole % 5-sodiosulfoisophthalic acid and 97.4 mole % isophthalic acid; 46.2 mole % 1,4-cyclohexanedimethanol and 53.8 mole % diethylene glycol. The second cycle glass transition temperature was 41° C.

Example D

Using the same type reactor as in Method 2, Example C, the following materials were charged to the reactor:
8.65 lbs isophthalic acid
2.57 lbs of the diethylene glycol diester of 5-sodiosulfoisophthalic acid at 46.5 weight percent in diethylene glycol
7.39 lbs 1,4-cyclohexanedimethanol
20.09 g of titanium tetraisopropoxide in n-butanol (2.54 weight percent Ti)
10.21 g of anhydrous sodium acetate The temperature of the heating medium was increased to 255° C. and held for 1 hour. The temperature of the heating medium was increased to 285° C. and the system was placed under <4000 microns pressure and held for 20 minutes. The polymer was extruded and cooled. The polymer had an I.V. of 0.43 and a composition by NMR of 5.5 mole % 5-sodiosulfoisophthalic acid and 94.5 mole % isophthalic acid; 79.3 mole % 1,4-cyclohexanedimethanol and 20.7 mole % diethylene glycol. The second cycle glass transition temperature by DSC was 67.7° C.

Using similar reaction conditions but varying the ratio of the components to achieve a different composition, the polymers shown below were prepared:

| Example | IPA | 5-Sodiosulfo-isophthalic Acid | CHDM | DEG | I.V. | Tg (°C.) |
|---|---|---|---|---|---|---|
| E | 97.2 | 2.8 | 82.7 | 17.3 | 0.42 | 67 |
| F | 92.9 | 7.1 | 82.0 | 18.0 | 0.36 | 69 |
| G | 94.2 | 5.8 | 71.7 | 28.3 | 0.44 | 61 |
| H | 93.5 | 6.5 | 71.4 | 28.6 | 0.44 | 62 |

Method 3

In addition to batch process reactors, the polymers can also be prepared in conventional continuous unit pilot plant or production equipment. Polymer with the following composition was obtained on such equipment.

| Example | IPA | 5-Sodiosulfo-isophthalic Acid | CHDM | DEG | I.V. | Tg (°C.) |
|---|---|---|---|---|---|---|
| I | 89.1 | 10.9 | 71.1 | 28.9 | 0.375 | 54.7 |
| J | 90.7 | 9.3 | 75.2 | 24.8 | 0.352 | 66.8 |

Preparation of Dispersions

The polymer systems can be dispersed in a solvent system consisting mainly of water but generally a cosolvent such as n-propanol or i-propanol is needed to obtain % solids of 20–35%. The amount of cosolvent required to disperse the polymers depends on the polymer composition, but generally all the polymers can be dispersed in refluxing (3:1 $H_2O$ n-propanol). Azeotrope can be removed to give a lower percent alcohol and higher percent solids.

Example K 20.0 Grams of n-propanol and 60.0 g distilled water were weighed into a three-necked flask. The sample was heated to reflux (about 88° C.) and 20 g of polymer (having a composition of 96 mole % isophthalic acid, 4 mole % 5-sodiosulfoisophthalic acid, 76 mole % cyclohexanedimethanol, and 24 mole % diethylene glycol) was introduced and the dispersion was stirred at reflux for 1 hour. A still head condenser was then used to remove 32 ml of azeotrope to give a dispersion with <2% n-propanol and about 28% solids.

Example L 128.8 Grams distilled water and 42.5 g n-propanol were charged to a flask and heated to reflux. 60.0 Grams of polymer (93% I, 7% 5-sodiosulfoisophthalate, 15 mole % diethylene glycol, 85 mole % 1,4-cyclohexanedimethanol) was introduced and the dispersion was stirred at reflux for 1 hour. 36.2 Grams of distillate was removed to give a final dispersion containing 30% polymer solids and 10% n-propanol.

Example M 12.0 Grams distilled water and 2.0 g n-propanol were placed in a flask and heated to reflux in boiling water using a magnetic stir bar and stirrer hot plate. 6.0 Grams of polymer (91 mole % I, 9 mole % 5-sodiosulfoisophthalate, 25 mole % diethylene glycol, and 75 mole % 1,4-cyclohexanedimethanol) was added to make a dispersion. The dispersion was stirred one hour, a thin, slightly opaque dispersion was obtained with theoretical 30% polymer solids and 10% n-propanol.

Example N 19,905 Grams of distilled water and 6,435 g n-propanol were charged to a 50-liter flask and stirred and heated to reflux (about 88° C.). 9,085 Grams of polymer (Example I) was charged as rapidly as possible to the flask via a funnel on the side arm. The dispersion was allowed to return to reflux and was boiled and stirred for 1 hour. The system was cooled 10° C. and then changed to accept a take-off receiver.

The system was heated again to reflux and 4743.6 g (5477.7 ml) was removed. The sample was cooled and filtered through a coarse screen. The dispersion contained 29.7% solids and 9.61% n-propanol.

The method shown in Example 12 was used to prepare dispersions of the following polymers at 30% solids and 10% n-propanol.

| Dispersion Example | Polymer Example | Polymer Target Composition. Mole % | | | |
|---|---|---|---|---|---|
| | | IPA | 5-Sodiosulfo-isophthalic Acid | CHDM | DEG |
| O | E | 97 | 3 | 85 | 15 |
| P (Comparative) | C | 97 | 3 | 46 | 54 |
| Q | D | 95 | 5 | 85 | 15 |
| R | G | 95 | 5 | 70 | 30 |
| S | F | 93 | 7 | 85 | 15 |
| T | H | 93 | 7 | 70 | 30 |
| U (Comparative) | B | 90 | 10 | 60 | 40 |
| V | J | 91 | 9 | 75 | 25 |

A method similar to Example L, except scaled up to 50-liter size, was used to prepare the following dispersion at 10% n-propanol, 30% solids:

W  9  91  9  75  25

In addition to the above-described polyesters, a comparative polyester was prepared in accordance with Example 1 of U.S. Pat. No. 4,883,714. This comparative example contains 82 mole % IPA, 18 mole % SIP, 54 mole % DEG and 46 mole % CHDM and will be referred to hereinafter as "polyester X".

EXAMPLE 1

This example illustrates the preparation and composition of blue millbase employed in formulating water-based inks. The blue pigment (i.e., Blue B2GA) from Hoechst corporation (Color Index Pigment Blue 15:3), defoamer, polyester dispersion and water are mixed using a paint shaker containing 400.0 g of glass beads for 4 hours.

The material is filtered through cheesecloth. The composition of the blue millbase is as follows:

| | Amount | |
|---|---|---|
| Ingredients | g | % wt |
| Blue pigment | 100 | 25.0 |
| Dispersion of Polyester X (30% Solids) | 202 | 50.5 |
| Defoamer | 2 | 0.5 |
| Water | 96 | 24.0 |

The polyester dispersion is used as a grinding vehicle to prepare the millbase.

EXAMPLE 2

This example illustrates the preparation and composition of white millbase employed in formulating an aqueous ink. Titanium dioxide is used as white pigment. The white pigment is from either Kemira or Du Pont. The white pigment and clay (ASP-072 from Engelhard) are added to the polyester dispersion. The ingredients are mixed vigorously using a blender for about half an hour. The resultant mixture is filtered using cheesecloth. The composition of the white millbase is as follows:

| | Amount | |
|---|---|---|
| Ingredients | g | % wt |
| $TiO_2$ (white pigment) | 540 | 54.0 |
| Clay | 60 | 6.0 |
| Polyester dispersion (30% solid) | 400 | 40.0 |

The dispersions of the polyester of Example V and Polyester X are used for preparing white millbases.

EXAMPLE 3

The blue millbase prepared in accordance with Example 1 is used to formulate a water-based blue ink. The blue millbase is added to the polyester dispersion containing the polyester of Example V in the presence of additives. The blue ink contains the following ingredients.

| Ingredients | Amount g | % wt |
|---|---|---|
| Polyester dispersion (30% solid of the polyester of Example V) | 100 | 91.6 |
| Blue millbase | 6 | 5.5 |
| Propylene Glycol | 3 | 2.7 |
| Tektamer (a biocide) | 0.2 | 0.2 |

The freeze-thaw stability of inks is monitored by viscosity change after aging the sample for 18-24 hours in the freezer at −22° F. The inks are completely gelled after freezing, but thaw at ambient temperature in 4-6 hours. The initial ink viscosity measured by Zahn Cup #2 is about 20 sec, which increases only about 5-10% after freeze-thaw in the presence of propylene glycol which demonstrates that the ink is freeze-thaw stable. The inks remain stable after five freeze-thaw cycles. The pigments can be incorporated in aqueous inks in the range of 2-50% by weight depending upon type of pigment and desired end-use of the ink.

EXAMPLE 4

The water-based ink prepared in accordance with Example 3 is used for evaluating printing process parameters. The ink is applied on aluminum foil, polyester film and coated papers with number 3 and 6 Meyer rods. These samples are allowed to dry for 24 hours at ambient temperature or dried in the oven at 100° C. for 3 sec. The water resistance of the samples is determined by a water spot test. Distilled water drops are left for 5, 10, 15 and 20 minutes and then wiped off gently with a facial tissue. The integrity of the ink film is visually assessed. The water spot test is rated as follows:
1. Poor: Total film removed
2. Fair: Partial film removed
3. Good: Dull or discolor film, but no removal
4. Excellent: The film is substantially unchanged The water resistance is excellent (i.e., a "4" rating) on all the substrates and at all sampling times.

EXAMPLE 5

The water-based ink prepared in accordance with Example 3 is tested for blocking resistance. The ink is applied on the substrates as described in Example 4. These samples are evaluated for blocking temperature using the PI Sentinel Heat Sealer at 40 psi for 5 sec. The samples are folded face-to-face printed surface, then placed under sealer at different temperatures. The test is repeated until the blocking occurred. The integrity of the printed film is visually assessed. The blocking resistance is rated as follows:
1. Poor: Picked and complete film removed
2. Fair: Picked, but partial film removed
3. Good: Slightly picked, but no film removed
4. Excellent: No picking and no film removed Blocking temperature is defined as the highest temperature where the printed ink retains a blocking resistance rating of greater than 3. The blocking temperature is in the range of 150°-160° F. on the various substrates.

EXAMPLE 6

The water-based ink prepared in accordance with Example 3 also exhibits excellent wetting on aluminum foil, polymer film and paper. The ink shows excellent hardness, adhesion, gloss, drying, rewetting of printed cylinder and scuff resistance on different substrates.

EXAMPLE 7

(Comparative)

This example illustrates the importance of propylene glycol in the water-based inks. Example 3 is repeated with the exception that an aqueous ink is formulated without propylene glycol. The blue ink contains the following ingredients.

| Ingredients | Amount g | % wt |
|---|---|---|
| Polyester dispersion (30% solid of the polyester of Example V) | 100 | 94.2 |
| Blue millbase | 6 | 0.2 |
| Tektamer | 0.2 | 0.2 |

The ink gels at −8° F. and does not thaw at room temperature. Moreover, adhesion, wetting, and film forming ability are extremely poor for the ink. These results demonstrate that the presence of propylene glycol can dramatically improve several desired properties of the printed ink films.

EXAMPLE 8

A white ink is prepared which contains the following ingredients:

| Ingredients | Amount g | % wt |
|---|---|---|
| Polyester dispersion (30% solid of the polyester of Example V) | 100 | 74.5 |
| White pigment | 30 | 22.3 |
| Propylene Glycol | 4 | 3.0 |
| Tektamer | 0.3 | 0.2 |

The ink exhibits excellent freeze-thaw stability, wetting of the substrates, adhesion, rewetting of the cylinder, gloss, hardness, drying and scuff resistance, water resistance and blocking temperature.

EXAMPLE 9

(Comparative)

Example 8 is repeated with the exception that the propylene glycol is eliminated from the formulation. The aqueous ink does not exhibit freeze-thaw stability.

EXAMPLE 10

(Comparative)

Example 3 is repeated with the exception that polyester X is used instead of the polyester of Example V in formulating water-based inks. The ink contains the following ingredients.

| Ingredients | Amount g | % wt |
|---|---|---|
| Polyester dispersion (30% solid of polyester X) | 100.0 | 44.0 |
| Blue millbase | 108.6 | 47.8 |
| Jonwax 26 from S. C. Johnson | 6.8 | 3.0 |
| Propylene Glycol | 11.4 | 5.0 |
| Tektamer | 0.6 | 0.2 |

The ink shows excellent freeze-thaw stability, gloss, adhesion, wettability, blocking resistance and scuff-resistance on several printed substrates such as aluminum foil, paper and polyester films.

EXAMPLE 11

(Comparative)

Example 10 is repeated with the exception that propylene glycol is removed from the formulation. The performance of the ink is poor in terms of water resistance on aluminum foil; however, the ink exhibits excellent freeze-thaw stability.

EXAMPLE 12

This example illustrates the preparation of water-based white ink with surprisingly improved performance. The ink contains the following composition:

| Ingredients | Amount g | % wt |
|---|---|---|
| Polyester dispersion (30% solid of the polyester of Example V) | 100.0 | 62.0 |
| White pigment | 43.2 | 26.8 |
| Clay ASP-072 | 4.8 | 3.0 |
| Jonwax 26 | 4.8 | 3.0 |
| Propylene Glycol | 8.1 | 5.0 |
| Tektamer | 0.3 | 0.2 |

The ink exhibits excellent freeze-thaw stability, gloss, wetting, adhesion, water-resistance, film forming ability, scuff-resistance on several substrates like metal foils, coated and uncoated papers, and polymer films.

EXAMPLE 13

(Comparative)

Example 12 is repeated with the exception that the propylene glycol is removed from the formulation. The ink gels at −8° F., and does not convert to liquid ink even after several days at an ambient temperature. The ink performance is also poor in terms of blocking-resistance and film forming ability of the printing substrates.

EXAMPLE 14

This example illustrates that the properties and performance of the polyester of Example V and polyester X can be improved drastically by blending the two polymer dispersions. Blends containing at least about 15 wt. % of polyester X in the polyester of Example V improve freeze-thaw stability. A small amount of propylene glycol (about 0.5% to 3% by weight) in many such blends renders them freeze-thaw stable. A water-based ink is formed by using a polymer blend as described above. The ink composition is as follows:

| Ingredients | Amount g | % wt |
|---|---|---|
| Polyester dispersion blend (30% solid) (20% polyester X and 80% polyester of Example V) | 100.0 | 90.0 |
| Blue pigment | 7.6 | 6.8 |
| Propylene Glycol | 3.3 | 3.0 |
| Tektamer | 0.2 | 0.2 |

The ink exhibits excellent freeze-thaw stability at −22° F. The performance of the ink is excellent in terms of water-resistance, gloss, blocking resistance, wettability and adhesion on various substrates.

EXAMPLE 15

Example 14 is repeated with the exception that the blue pigment is replaced with white pigment. The amount of white pigment incorporated in the ink is 15.0% instead of 6.8%. The ink is freeze-thaw stable, and performance of the ink is excellent on various substrates.

EXAMPLE 16

Examples 3, 8, 10 (Comparative), 12 and 14 are repeated with the exception that the pigments are removed from the formulations, and the resultant formulations are used as aqueous-based overprints. The overprint formulations are freeze-thaw stable at −22° F. The performance of the overprints is excellent in terms of gloss, blocking resistance, water-resistance and adhesion.

EXAMPLE 17

(Comparative)

White millbase prepared in accordance with Example 2 is employed to formulate a water-based white ink. The white millbase is added to the polyester dispersion containing the polyester of Example V in the presence of additives. The white ink contains the following ingredients.

| Ingredients | Amount g | % wt |
|---|---|---|
| Polyester dispersion (30% solid of the polyester of Example V) | 100 | 74.5 |
| White pigment | 30 | 22.3 |
| Methyl Propasol (Propylene Glycol Monomethyl Ether) | 4 | 3.0 |
| Tektamer | 0.3 | 0.2 |

For freeze-thaw stability, the ink is placed in the freezer for 18-24 hours at −22° F. The ink is completely gelled and remains gel after thawing at room temperature, i.e., is freeze-thaw unstable.

EXAMPLE 18

(Comparative)

Example 17 is repeated with the exception that methyl propasol is 6.0 g instead of 4.0 g in the formulation. The ink is converted to a gel at −22° F. and remains gel after thawing at room temperature, i.e., is freeze-thaw unstable.

EXAMPLE 19

(Comparative)

Example 17 is repeated with the exception that propyl propasol (propylene glycol monopropyl ether) is used instead of methyl propasol. The formulated ink is converted to a gel at −22° F. and remains in the gel state after thawing at room temperature, i.e., is freeze-thaw unstable.

EXAMPLE 20

(Comparative)

Example 17 is repeated with the exception that isopropyl acetate is used instead of methyl propasol. The formulated ink is converted to a gel at −22° F. and remains semi-gel at room temperature, i.e., is freeze-thaw unstable.

EXAMPLE 21

Example 17 is repeated with the exception that propyl acetate is used instead of methyl propasol. The ink is converted to a gel at −22° F. and remains in the semi-gel form at room temperature, i.e., is freeze-thaw unstable.

EXAMPLE 22

Freeze-Thaw Stability of Experimental Polymers with Propylene Glycol

Freeze-thaw stability of an ink or an overprint is monitored by viscosity reading before and after aging the samples for 17 hours in the freezer at 0° F. The samples after freezing are allowed to thaw completely at room temperature and their viscosity is then measured to determine if there had been any change in viscosity. If the viscosity changes are too high (more than 30%) or the samples are too thick to measure, the inks or overprints are considered as unstable.

Three, five and ten grams of propylene glycol are added to 100 grams of the polyesters of Examples D, H and V with stirring. These samples are then put in the freezer along with samples of the polyesters of Examples D, H and V without propylene glycol for the freeze-thaw stability test as described above. The results are listed as follows:

| Polyester | Propylene Glycol (Wt. %) | | | |
|---|---|---|---|---|
|  | 0 | 3 | 5 | 10 |
| Example D | No* | No | No | Yes** |
| Example H | No | Yes | Yes | Yes |
| Example V | No | No | Yes | Yes |
| Polyester X (Example 1 of U.S. Pat. No. 4,883,714) | Yes | Yes | Yes | Yes |

*No means unstable
**Yes means stable

The invention has been described in detail with particular reference to preferred embodiments thereof, but it will be understood that variations and modifications can be effected within the spirit and scope of the invention.

We claim:

1. An ink composition or concentrate thereof comprising:
    (a) about 4 to 80 weight percent of at least one linear, water-dissipatable polyester having an inherent viscosity of at least about 0.1 as measured in a 60/40 parts by weight solution of phenol/tetrachloroethane at 25° C. and at a concentration of 0.5 grams of polyester in 100 ml of solvent, the polyester containing substantially equimolar proportions of acid moiety repeating units (100 mole %) to hydroxy moiety repeating units (100 mole %), the polyester comprising repeating units of components (a), (b), (c) and (d), as follows wherein all stated mole percentages are based on the total of all acid and hydroxy moiety repeating units being equal to 200 mole %:
        (a) about 90 to about 97 mole % isophthalic acid,
        (b) about 3 to about 10 mole % 5-sulfoisophthalic acid,
        (c) about 70 to about 85 mole % 1,4-cyclohexanedimethanol, and
        (d) about 15 to about 30 mole % diethylene glycol;
    (B) 0 to about 60 weight percent colorant;
    (C) 0 to about 95 weight percent water; and
    (D) an effective amount of propylene glycol, so that there is no substantial change in the viscosity of the ink composition when kept at ambient temperature for 4–8 hours after being stored at −30° C. for about 18–24 hours.

2. An ink composition or concentrate thereof comprising:
    (A) about 4 to 80 weight percent of at least one linear, water-dissipatable polyester having an inherent viscosity of at least about 0.1 as measured in a 60/40 parts by weight solution of phenol/tetrachloroethane at 25° C. and at a concentration of 0.5 gram of polyester in 100 ml of solvent, the polyester containing substantially equimolar proportions of acid moiety repeating units (100 mole %) to hydroxy moiety repeating units (100 mole %), the polyester comprising repeating units of components (a), (b), (c) and (d), as follows wherein all stated mole percentages are based on the total of all acid and hydroxy moiety repeating units being equal to 200 mole %:
        (a) about 90 to about 97 mole % isophthalic acid,
        (b) about 3 to about 10 mole % 5-sulfoisophthalic acid,
        (c) about 70 to about 85 mole % 1,4-cyclohexanedimethanol, and
        (d) about glycol;
    (B) 0 to about 60 weight percent colorant;
    (C) 0 to about 95 weight percent water; and
    (D) from about 0.5 to about 10 weight percent of propylene glycol.

3. The ink composition of claim 1 wherein Component (B) is present in an amount of at least 0.5 weight percent.

4. The ink composition of claim 2 wherein Component (B) is present in an amount of at least 0.5 weight percent.

5. The ink composition of claim 2 wherein Component (A) is present in an amount of about 5 to 40 weight percent, Component (B) is present in an amount of about 0 to 35 weight percent, and Component (C) is present in an amount of about 35 to 90 weight percent.

6. The ink composition of claim 5 wherein Component (D) is present in an amount of about 3 to about 5 weight percent.

7. The ink composition of claim 2 additionally comprising up to about 15 weight percent of one or more additional additives.

8. The ink composition of claim 2 additionally containing up to about 3 weight percent of one or more additional additives selected from the group consisting of a surfactant, a wax defoamer, a biocide, a thickener, a pH stabilizer, an alcohol, and a mixture thereof.

9. The ink composition of claim 1 further comprising about 5.0 to about 30.0 weight percent, based on the weight of Component (A), of a different water-dispersible polyester.

10. The ink composition of claim 2 further comprising about 1.0 to about 40.0 weight percent, based on the weight of Component (A), of a different water-dispersible polyester.

11. The ink composition of claim 3 wherein said colorant is one or a mixture of the following color index materials: C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I. Pigment Red 57:1, C. I. Pigment Red 49:1, C. I. Pigment Violet 23, C. I. Pigment Green 7, C. I. Pigment Blue 61, C. I. Pigment red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, C. I. Pigment Orange 5, C. I. Pigment Black 7, C. I. Pigment Yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C. I. Pigment Red 23, C. I. Pigment Red 112, C. I. Pigment Yellow 126, C. I. Pigment Red 169, C. I. Pigment Orange 13, C. I. Pigment Red 1-10, 12, C. I. Pigment Blue 1:X, C. I. Pigment Yellow 42, C. I. Pigment Red 101, C. I. Pigment Brown 6, C. I. Pigment Brown 7, C. I. Pigment Brown 7:X, C. I. Pigment Black 11, C. I. Pigment Metal 1, or C. I. Pigment Metal 2.

12. The ink of claim 4 wherein said colorant is one or a mixture of the following color index materials: C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I. Pigment Red 57:1, C. I. Pigment Red 49:1, C. I. Pigment Violet 23, C. I. Pigment Green 7, C. I. Pigment Blue 61, C. I. Pigment Red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, C. I. Pigment Orange 5, C. I. Pigment Black 7, C. I. Pigment yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C. I. Pigment Red 23, C. I. Pigment Red 112, C. I. Pigment Yellow 126, C. I. Pigment Red 169, C. I. Pigment Orange 13, C. I. Pigment Red 1-10, 12, C. I. Pigment Blue 1:X, C. I. Pigment Yellow 42, C. I. Pigment Red 101, C. I. Pigment Brown 6, C. I. Pigment Brown 7, C. I. Pigment Brown 7:X, C. I. Pigment Black 11, C. I. Pigment Metal 1, or C. I. Pigment Metal 2.

13. The ink of claim 1 wherein the polyester of component (A) comprises about 91 mole % isophthalic acid, about 9 mole % 5-sodiosulfoisophthalic acid, about 75 mole % 1,4-cyclohexanedimethanol, and about 25 mole % diethylene glycol.

14. The ink of claim 2 wherein the polyester of component (A) comprises about 91 mole % isophthalic acid, about 9 mole % 5-sodiosulfoisophthalic acid, about 75 mole % 1,4-cyclohexanedimethanol, and about 25 mole % diethylene glycol.

15. The ink of claim 1 wherein the polyester of component (A) comprises about 93 mole % isophthalic acid, about 7 mole % 5-sodiosulfoisophthalic acid, about 70 mole % 1,4-cyclohexanedimethanol, and about 30 mole % diethylene glycol.

16. The ink of claim 2 wherein the polyester of component (A) comprises about 93 mole % isophthalic acid, about 7 mole % 5-sodiosulfoisophthalic acid, about 70 mole % 1,4-cyclohexanedimethanol, and about 30 mole % diethylene glycol.

17. The ink of claim 1 wherein the polyester of component (A) comprises about 93 mole % isophthalic acid, about 7 mole % 5-sodiosulfoisophthalic acid, about 85 mole % 1,4-cyclohexanedimethanol, and about 15 mole % diethylene glycol.

18. The ink of claim 2 wherein the polyester of component (A) comprises about 93 mole % isophthalic acid, about 7 mole % 5-sodiosulfoisophthalic acid, about 85 mole % 1,4.cyclohexane. dimethanol, and about 15 mole % diethylene glycol.

19. The ink of claim 1 wherein the polyester of component (A) comprises about 95 mole % isophthalic acid, about 5 mole % 5-sodiosulfoisophthalic acid, about 85 mole % 1,4-cyclohexanedimethanol, and about 15 mole % diethylene glycol.

20. The ink of claim 2 wherein the polyester of component (A) comprises about 95 mole % isophthalic acid, about 5 mole % 5-sodiosulfoisophthalic acid, about 85 mole % 1,4-cyclohexanedimethanol, and about 15 mole % diethylene glycol.

21. The ink of claim 1 wherein the polyester of component (A) comprises about 95 mole % isophthalic acid, about 5 mole % 5-sodiosulfoisophthalic acid, about 70 mole % 1,4-cyclohexanedimethanol, and about 30 mole % diethylene glycol.

22. The ink of claim 2 wherein the polyester of component (A) comprises about 95 mole % isophthalic acid, about 5 mole % 5-sodiosulfoisophthalic acid, about 70 mole % 1,4-cyclohexanedimethanol, and about 30 mole % diethylene glycol.

23. The ink of claim 1 wherein the polyester of component (A) comprises about 97 mole % isophthalic acid, about 3 mole % 5-sodiosulfoisophthalic acid, about 85 mole % 1,4-cyclohexanedimethanol, and about 15 mole % diethylene glycol.

24. The ink of claim 2 wherein the polyester of component (A) comprises about 97 mole % isophthalic acid, about 3 mole % 5-sodiosulfoisophthalic acid, about 85 mole % 1,4-cyclohexanedimethanol, and about 15 mole % diethylene glycol.

25. The ink of claim 1 wherein the component (b) of the polyester of component (A) is in the form of a sodium salt.

26. The ink of claim 2 wherein the component (b) of the polyester of component (A) is in the form of a sodium salt.

27. The ink of claim 1 wherein the polyester of component (A) has an inherent viscosity of about 0.2 to about 0.6.

28. The ink of claim 2 wherein the polyester of component (A) has an inherent viscosity of about 0.2 to about 0.6.

29. The ink of claim 1 coated onto a substrate selected from the group consisting of metal foil, newsprint, bleached Kraft paper, unbleached Kraft paper, clay coated paper, glass, calendered paper, stainless paper, paper board, polyester, polycarbonate, cellulose ester, regenerated cellulose, poly(vinylidene chloride), polyamide, polyolefin, and polystyrene.

30. The ink of claim 2 coated onto a substrate selected from the group consisting of metal foil, newsprint, bleached Kraft paper, unbleached Kraft paper, clay coated paper, glass, calendered paper, stainless paper, paper board, polyester, polycarbonate, cellulose ester, regenerated cellulose, poly(vinylidene chloride), polyamide, polyolefin, and polystyrene.

* * * * *

UNITED STATES PATENT AND TRADEMARK OFFICE
CERTIFICATE OF CORRECTION

PATENT NO. : 5,129,947
DATED : July 14, 1992
INVENTOR(S) : Mahendra K. Sharma and Hieu D. Phan It is certified that error appears in the above-identified patent and that said Letters Patent is hereby corrected as shown below:

Column 20, line 28 (Claim 2, line 22), between "about" and "glycol", ---15 to about 30 mole % diethylene--- should be added.

Column 22, line 11 (Claim 18, line 4), "1,4.cyclohexane. dimethanol," should be ---1,4-cyclohexanedimethanol,---.

Signed and Sealed this

Seventeenth Day of August, 1993

Attest:

BRUCE LEHMAN

*Attesting Officer*   *Commissioner of Patents and Trademarks*